United States Patent [19]
Van Gils

[11] 3,802,906
[45] Apr. 9, 1974

[54] METHOD OF IMPROVING WIRE ADHESION TO RUBBER

[76] Inventor: Gerard E. Van Gils, 262 Milton Dr., Tallmadge, Ohio 44278

[22] Filed: Aug. 7, 1972

[21] Appl. No.: 278,308

[52] U.S. Cl................... 117/49, 117/79, 117/128.4, 117/128.7, 156/124, 156/136, 156/153, 117/66
[51] Int. Cl................................................ B44d 1/02
[58] Field of Search ......... 117/49, 79, 128.4, 128.7, 117/66; 156/124, 136, 153

[56] References Cited
UNITED STATES PATENTS

| | | | |
|---|---|---|---|
| 2,321,889 | 6/1943 | Bailey et al. | 117/79 X |
| 2,379,978 | 7/1945 | Meyer | 117/79 UX |
| 2,409,759 | 10/1946 | Hosking | 156/153 UX |
| 2,703,550 | 3/1955 | Bell | 117/49 X |

FOREIGN PATENTS OR APPLICATIONS

| | | | |
|---|---|---|---|
| 539,585 | 9/1941 | Great Britain | 117/49 |
| 577,640 | 5/1946 | Great Britain | 117/49 |

OTHER PUBLICATIONS

Messenger, J. H., "Bonding of Rubber to Ferrous Metals by Brass Plating. Tabulated Analysis of Proposed Practice." Journal of Rubber Research, pp. 181–189, 9/46.

*Primary Examiner*—J. Spencer Overholser
*Assistant Examiner*—Ronald J. Shore

[57] ABSTRACT

A rubber bondable metal surface is pretreated by coating it with an organic oil mixture and rubbing it with a slightly abrasive material prior to adhering the treated metal to a natural or synthetic rubber. The adhering of the metal to rubber is accomplished by merely heating the rubber to bond it to the pretreated metal or by also adding a coating of adhesive between the pretreated metal and rubber and curing the composite to bond the adhesive contacting surfaces.

3 Claims, No Drawings

METHOD OF IMPROVING WIRE ADHESION TO RUBBER

BACKGROUND OF THE INVENTION

1. Field of the Invention

This invention relates generally to methods of bonding rubber adherent metal surfaces to rubber, and in particular, to a method of pretreating the rubber adherent metal surface prior to bonding it to rubber to provide an improved bond between the surfaces.

2. Description of the Prior Art

Bonding of metal to rubber is utilized in the manufacture of various devices, including isolation mounts, wherein a motor or other device subject to oscillation is mounted to a retaining panel by way of an elastomeric grommet, and in making tires, wherein a series of wire strands are bonded to the rubber of the tire to give it strength and durability.

The bonding of metal to rubber material, both natural as well as synthetic, has been accomplished in the past by numerous methods, including mechanical press fitting, adhesive bonding, and vulcanizing rubber to metal.

It is generally known that to obtain a good bond between metal and an elastomeric material the metal surface must first be cleaned from adhering oxides, grease, oil and various other contaminants. This cleaning has in the past been mechanically accomplished by rubbing the metal surface with abrasives, such as sandpaper and steel wool or sandblasting the metal surface. Such mechanical treatment to render the metal surface clean, smooth, bright and continuous is disclosed in U.S. Pat. No. 2,409,759. Chemical cleaning methods, such as wiping with a strong acid or alkaline solution or washing with a solvent such as trichloroethylene have also been used.

Tire building involves the adhering of brass plated steel wire cords to various tire rubber components such as belts and bands, as well as the carcass, to thereby increase the strength and durability of these individual parts and ultimately of the composite tire. The strength of the bond between the rubber tire parts and the wire cords will to a large extent determine the quality of the resultant tire. The wire used in tire building is received from the wire manufacturer in a precleaned state and is packed in hermetically sealed drums wherein a dessicant such as that sold by the W. A. Hammond Drierite Co. under the trademark "Drierite, or other water absorbing material is also contained to keep the wire dry and ready for immediate use in tire building. The wire is removed from the sealed containers and is cured into the tire rubber directly or with the additional use of various adhesives well known to those familiar with the art of tire building.

The bond between the wire and tire rubber obtained thereby is sufficiently strong if the wire cord is used immediately after being removed from the sealed container. However, upon exposure to the ambient atmosphere, the adhesion obtainable by bonding decreases rapidly due to surface contamination and moisture absorption by the wire.

SUMMARY OF THE INVENTION

According to one mode of the present invention, a method for pretreating a brass plated wire cord is disclosed which solves the above-mentioned problems, and others, which method comprises subjecting the wire to pretreatment by coating the wire with an organic oil mixture and rubbing it with a lightly abrasive material prior to the curing of the wire into the natural or synthetic rubber material. The pretreatment steps are performed either in the order indicated or simultaneously to provide improved adhesion as well as to reduce loss of adhesion from atmospheric contamination of the wire as it remains open to atmospheric conditions in the tire assembly area once the sealed container is broken.

According to another mode of the invention, an improved method of bonding a rubber adherent metal surface, such as brass plated wire, to a natural or synthetic rubber surface is disclosed wherein the metal surface coated with an organic oil mixture which is chemically compatible with the rubber, then cleaned or lightly abraded. By chemically compatible is meant an organic oil which can readily mix with the rubber without decomposing it, breaking it down chemically, or in any other way damaging the rubber. The metal and rubber surfaces are pressed together and heated to produce an improved bond between them.

The primary object of this invention is to provide a method of treating a rubber adherent metal surface to improve the bond obtainable with natural or synthetic rubber surfaces.

Another object of this invention is to provide a method of treating a rubber adherent wire metal surface to reduce atmospheric contamination and the resultant loss of adhesion with rubber materials.

Yet another object of this invention is to provide an improved method of bonding a rubber adherent metal surface to a natural or synthetic rubber surface to obtain a stronger bond thereby.

DESCRIPTION OF THE PREFERRED EMBODIMENT

The basis for the present invention is the discovery that in the bonding of brass plated wire to tire ply stock of natural or synthetic rubber materials, an improved bond between the rubber and the brass plated wire is obtained if the wire is pretreated by coating with specific coatings and abrasion. This pretreatment of the wire also makes the wire resistant to atmospheric contamination and allows it to be stored in open containers after such pretreatment, and to be bonded to the rubber at a later date without suffering a significant loss in the adhesion between the wire cord and the rubber.

Strong adhesion between wire and rubber is critical in the building of tires, wherein the bead component of the tire as well as the belts in belted bias-ply tires and belts and carcasses of radial-ply tires utilize wire reinforcing.

The wire cord used in belted tires generally comprises seven strands of brass-plated steel wire, each of 0.0059 inch diameter, which wires are laid over a core of three wires, each of the same diameter as above. This type of wire is produced by Bekaert Steel and Wire Company, Glanzstoff AG, as well as by other companies. The wire is shipped by these manufacturers in sealed containers having a dessicant material therein to maintain the wire dry.

The tire material to which these wires are bonded is a specific formulation of rubber material suited to the needs and requirements of that particular tire component whether it be belt, carcass, or bead. Such special rubber formulations are well known to those familiar with the art of rubber formulation and tire engineering.

As an example, the following is a typical formulation for the carcass rubber, with the number of parts of each given at the right:

| | |
|---|---|
| natural rubber | 100 |
| Endor (peptizer from DuPont) | 3 |
| EPC carbon black | 50 |
| ZnO | 10 |
| BLE 25 (antioxidant made by Uniroyal Chemical) | 2 |
| Laurex (=lauric acid) | 2 |
| Cobalt tallate | 5.5 |
| MBT (accelerator) | 1 |
| Crystex (insoluble sulfur) | 3.8 |
| Cure: 35 minutes at 287°F. | |

In the manufacture of reinforcing belt material for tires, the wire is joined with the particular formulation of rubber compound by calendering the wire to the rubber so that the wire becomes embedded in the rubber. In the subsequent curing of the tire, the actual bonding of the rubber and the wire cord is effected.

To determine the strength of the bond between the wire cord and the rubber and the effect that various pre-treatment methods have on the strength of this bond, the wire was removed from the sealed shipping containers and subjected to various combinations of coating and abrasion immediately prior to bonding the wire to the rubber material. The force required to break the bond produced by the variously pretreated wires was repeatedly recorded and the average value calculated. These calculated values appear below in Table I along with the pretreating process associated therewith. Each value represents the average of 16 tests performed under the same conditions and with the same materials. The tests were performed according to the new adhesion test as described by L. C. Coates and C. Lauer in their article, "Wire Adhesion Testing," Rubber Chem. and Tech., Vol. 45, Mar. 1972, page 16.

The abrasion, where performed, was accomplished by light rubbing of the wire with the abrasive material specified. In the experiments, the mechanical abrader was added on to a dipping unit. The cord first passed through the treating liquid and then through an arrangement of motor driven brushes. The faces of the brushes are set at 120° angles to each other about a central axis through which the wire passed, at a rate of 233 feet per minute. The coating material was applied by immersing the wire cord in the coating material specified so as to wet the external area of the wire cord.

It is seen from the results of Experiment No. 4 from Table I that mere abrasion of the wire cord produces an insignificant increase, if any, in rubber adhesion when clean wire cord is utilized. However, when the abrasive treatment is coupled with a coating of organic oil as in Experiments Nos. 9, 10, 11, 12, 13, 14 and 17 a significant increase in rubber adhesion results with the optimum organic oil coating material being the mixture of methyl naphthalene and chlorothane as used in Experiment No. 9.

To determine the protection from atmospheric contamination with the resultant loss of adhesion therefrom, various wire pretreatment methods were also attempted. The pretreated wires were removed from their sealed containers and they were subjected to the mentioned pretreatment methods and bonded to the rubber compound after being exposed to the atmosphere for various periods of time. The force required to break the bond produced by wires with the various pretreatment methods was repeatedly checked and the average of the repeated tests taken. The results of these tests appear below in Table II.

TABLE II

| Wire Treatment | Wire Source | Exposure time, days | | | |
|---|---|---|---|---|---|
| | | 0 | 2 | 7 | 8 |
| None | B | 165 | 147 | 99 | 98 |
| | G | 180 | 148 | 114 | 83 |
| Abraded, glass wool, 99 Chlorothane NU, 1 Mobil wax | B | 195 | — | 147 | — |
| | G | 216 | — | 151 | — |
| Abraded, glass wool, 99 Chlorothane NU, 1 paraffin oil | B | 203 | | 167 | |
| Abraded, glass wool, 90 Chlorothane NU, 10 Mobil wax | B | 186 | — | 171 | — |
| | G | 212 | — | 186 | — |
| Abraded, glass wool, 99 Chlorothane NU, 1 Circosol | B | 202 | — | 128 | — |
| | G | 209 | — | 156 | — |
| Abraded, glass wool, 99 Chlorothane NU, 1 methyl naphthalene | B | 209 | — | 118 | — |
| | G | 226 | — | 122 | — |

Notes:
B — Bekaert
G — Glanzstoff

A comparison of the adhesion loss over 8 days for the wire cord as removed from the sealed container with the adhesion loss of wire cord abraded and coated with an organic oil mixture shows that the pretreatment of the wire cord reduces the adhesion loss with time. The pretreatment using coating with a mixture of 9 parts chlorothane to one part wax and abrasion with glass

TABLE I

| Experiment number | Abrasion | Coating materials | Wire cord supplier | |
|---|---|---|---|---|
| | | | Bekaert, X | Glanzstoff AG, X |
| 1 | None | None | 158 | 189 |
| 2 | do | Chlorothane NU rinse only [1] | 162 | 176 |
| 3 | do | Benzene rinse only | 182 | 180 |
| 4 | Steel wool | None | 178 | 189 |
| 5 | do | Chlorothane NU | 175 | 173 |
| 6 | do | Benzene | 182 | |
| 7 | Glass wool | None | 181 | |
| 8 | do | Carbon disulfide | 198 | |
| 9* | do | 1 methyl naphthalene, 99 Chlorothane NU | 209 | 226 |
| 10* | do | 1 Circosol,[2] 99 Chlorothane NU | 202 | 209 |
| 11* | do | 1 Mobil wax,[3] 99 Chlorothane NU | 195 | 216 |
| 12* | do | 10 butanol, 90 paraffin oil | 187 | 212 |
| 13* | do | 50 benzene, 50 paraffin oil | 189 | 205 |
| 14* | do | Paraffin oil | 194 | 210 |
| 15 | None | Spray of 1 Mobil wax, 99 Chlorothane NU | 169 | 186 |
| 16 | do | Dip of 1 Mobil wax, 99 benzene | 187 | 179 |
| 17* | Glass wool | 1 Mobil wax, 99 benzene | 193 | 217 |

[1] An industrial solvent, "inhibited" 1, 1, 1-trichloroethane.
[2] A naphthenic oil, a non-staining processing oil, Sun Oil Co.
[3] Refined wax, melting point 133–135° F., Mobil Oil Co.

wool produced the highest adhesion value after 7 days exposure to atmospheric conditions. The adhesion force was 171 and 186 pounds for Bekaert and Glanzstoff wire, respectively, as compared to adhesion values of 99 and 114 pounds for the respective untreated wire after 7 days atmospheric exposure.

The above mentioned untreated wire subjected to 7 days atmospheric exposure was then coated with a solution of 99 parts chlorothane and one part paraffin oil and abraded with glass wool. The adhesion of the Bekaert and Glanzstoff thusly treated wire was checked and found to have increased from 99 and 114 pounds to 159 and 164 pounds, respectively.

These tests show that treating the wire by coating it with an organic oil solution and abrading it produces increased adhesion to rubber over clean wire shipped from the manufacturer in sealed containers as well as over merely abraded wire. This pretreatment method also reduces the adhesion loss produced by exposure to atmospheric conditions as well as producing increased adhesion in cases where the wire has been exposed to the atmosphere.

In adapting the process of the present invention to mass production techniques, an advantageous arrangement is to mount a large number of reels of the plated wire (as many as 50 or 100) and guide the wires as they are unrolled, such that they are spaced close together and define a horizontal plane. The series of wires then passes between a pair of abrading wheels (preferably of thin wires or glass fibers, and turning in a direction opposite to the travel of the wires). The wheels should be at least as wide as the series of wires (if there are 100 wires, one-fourth inch apart, the wheels must be at least 25 inches wide). The bottom wheel turns through a reservoir of the organic oil material, thereby picking up the oil, and the wheel then abrades the wire and coats it at the same time. If it is desirable, the series of wires can then proceed directly into the calender to be pressed into the rubber material. When the latter step is to be done integrally, the number of wires needed at the calender will determine the number of wires to be processed according to the method of the present invention.

What I claim as new and desire to secure by Letters Patent of the United States is:

1. A method of pretreating a rubber bondable metal surface intended for adhering to a natural or synthetic rubber surface comprising the steps of:

A. applying an organic mixture by weight of nine parts chlorothane and one part organic wax to the exposed area of said metal surface, said mixture being chemically compatible with the rubber of said rubber surface and also being adapted to reduce atmospheric contamination of said metal surface prior to adherence to said rubber surface; and B. abrading said metal surface with a glass wool abrasive material to provide an abraded, coated surface thereon.

2. A method of pretreating a rubber bondable metal surface as set forth in claim 1 wherein said steps of applying said mixture and abrading said metal surface are performed substantially simultaneously.

3. A method of pretreating a rubber bondable metal surface as set forth in claim 1 wherein the chlorothane in said mixture evaporates after said step of abrading said metal surface.

* * * * *

UNITED STATES PATENT OFFICE
CERTIFICATE OF CORRECTION

Patent No. 3,802,906　　　　　　　　Dated April 9, 1974

Inventor(s) Gerard E. van Gils

It is certified that error appears in the above-identified patent and that said Letters Patent are hereby corrected as shown below:

Column 1, line 48, ""Drierite," should read
　　　　　　-- "Drierite", --

Signed and sealed this 19th day of November 1974.

(SEAL)
Attest:

McCOY M. GIBSON JR.　　　　　　C. MARSHALL DANN
Attesting Officer　　　　　　　Commissioner of Patents